Jan. 16, 1968     A. L. BOTKIN     3,363,305
METHOD OF MAKING A SCREW CAP LINER AND ASSEMBLING
SAME IN A SCREW CAP
Original Filed May 28, 1962
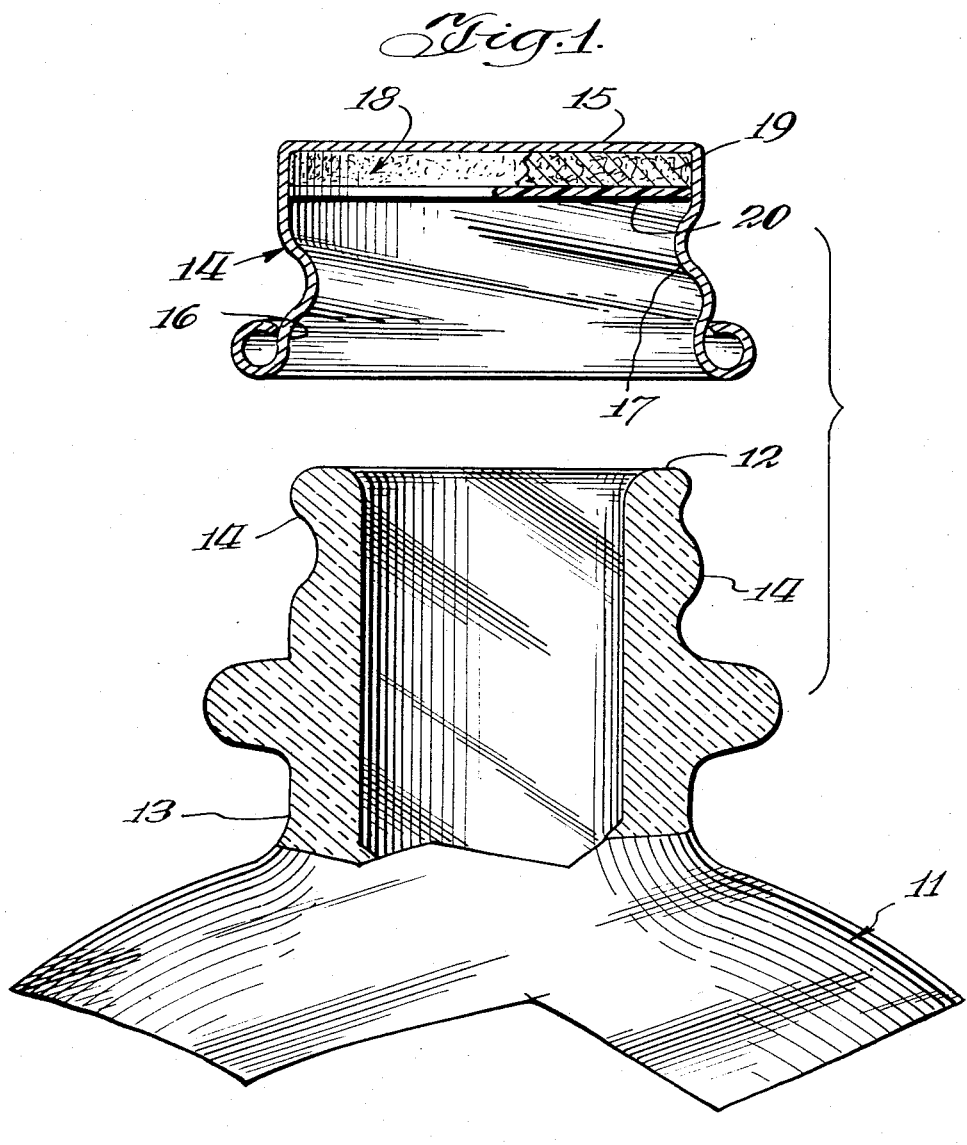
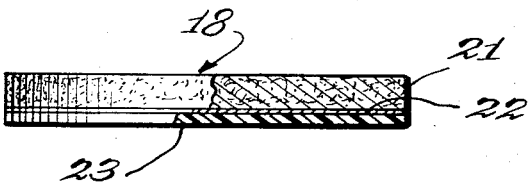
Inventor
Albert L. Botkin
By Dressler, Goldsmith, Clement, Gordon & Ladd
Attorneys

United States Patent Office 3,363,305
Patented Jan. 16, 1968

3,363,305
METHOD OF MAKING A SCREW CAP LINER AND ASSEMBLING SAME IN A SCREW CAP
Albert L. Botkin, 3018 W. Hood Ave., Chicago, Ill. 60645
Original application May 28, 1962, Ser. No. 198,088, now Patent No. 3,202,308, dated Aug. 24, 1965. Divided and this application June 24, 1965, Ser. No. 466,792
8 Claims. (Cl. 29—458)

This application is a division of my application S.N. 198,088 filed May 28, 1962, now Patent No. 3,202,308. This invention relates to method of making closure liners and particularly to liners adapted to provide seals on bottles or jars when used in bottle and jar closure caps.

The closure caps are those adapted to be sealed upon application of torque, including continuous thread screw caps and lug caps with internal lugs adapted to engage external lugs on the neck of the bottle or jar and to be seated by twisting action. For convenience both types of torque sealable caps are called "screw caps" herein.

Continuous threaded closures may be metal caps preformed as a drawn shell having a dependent skirt upon which a spiral thread is rolled or impressed. Alternatively they may be plastic caps wherein threading is molded as an integral part of the inner wall surface of the skirt portion. Or the caps may be formed on the bottle from a metal cap shell placed over the open mouth of the bottle and impressed with threads by the helical rotary action of steel rollers acting on the skirt of the cap against the molded thread of the bottle neck.

Screw caps used as closure members for bottles and jars include a liner member for providing a seal when the screw cap is twisted into its closing position.

The screw cap liner is usually made up of a board layer which is compressible and an impervious layer which is compressed against the lip of the bottle or jar when a sealing torque is applied to the screw cap.

The board layer is usually paperboard, although in some cases cork, plastic foam or rubber foam or sponge, may be used.

The impervious layer is usually a coated paper.

In accordance with this invention there is provided a method of making a screw cap liner having a compressible board layer, and having an impervious layer of an ordered polyolefin film directly attached to said board layer.

An ordered polyolefin is one having a molecular configuration conducive to high crystallinity in the polymer. In the case of polyethylene an ordered polymer is a substantially linear polymer of high density and a minimum amount of branching. In the case of polypropylene and polymers of higher olefins an ordered polymer is a polymer having controlled branching, such as an isotactic polymer or a syndiotactic polymer.

Such polymers are highly crystalline, dense, impermeable and of high softening temperatures. It is preferred to use polyolefins having softening temperatures in excess of about 250° F. In the polyethylene densities above 0.95 are preferred.

The polyolefin film layer of the closure liners of this invention can be extruded directly on to the board layer to produce a polyolefin coated board which can then be cut into discs for use as closure liners. It is surprising that a satisfactory coated board may be made in this manner from high density polyethylene, since this resin, when coated on paper causes excessive curling and produces coated papers which are very unsatisfactory for laminating to board.

The compressible paperboard layer is resilient in that it recovers at least partially after compression. The paperboard layer is usually about 35 to 45 mils thick.

The polyolefin film is usually about 1 to 2 mils in thickness. Thicknesses below 1 mil are usually not sufficiently impermeable for the purpose of this invention and thicknesses above 2 mils are uneconomical. The polyolefin layer is usually pigmented for opacity and more attractive appearance by pigments such as titanium dioxide, as is well known in the film-making art.

The paperboard layer is extrusion coated under conditions similar to those used for extrusion coating the same resinous films on other substrates. In general, the olefin is extruded through a narrow slit die and drawn to the nip between two rollers. The paperboard passes over one of the rollers to the nip and the film-paperboard composite formed as the nip passes over the other roll for cooling. Extrusion conditions will vary, as is well known in the art, depending on the nature of the resin and the thickness of the film desired.

If desired and particularly where exceptional impermeability is required, the paperboard to which the extruded resinous film is applied may be a metal foil-coated paperboard. The metal foil is usually about ⅓ mil thick and is usually aluminum foil although any foil-forming metal may be used. In foil-coated paperboard, as is well known in the paper making art, the metal foil is laminated to the paperboard case by any suitable adhesive.

The invention may be best described by reference to the drawings in which FIGURE 1 is a partial cross sectional view of a bottle neck and closure and FIGURE 1a is a cross sectional view of an alternative type of closure.

In FIGURE 1, bottle 11 has a lip 12 and a neck 13 and has a thread 14 projecting beyond the outer wall of the neck. The cap 14 has a flattened portion 15 adapted to rest against the lip 12 and has a raised portion 16 which has a thread 17 projecting inwardly and adapted to engage thread 14 of the neck. Screw cap liner 18 normally rests within the cap against the inner surface of flattened portion 15. It consists of the paperboard layer 19 and the plastic film layer 20. The paperboard layer rests against the inner flattened portion of the cap and the film layer rests against lip 12 of the bottle when the screw cap is applied.

In the embodiment of FIGURE 1a the paperboard layer is a metal foil-coated layer so that the final composite has three layers, a paperboard layer 21, a metal foil layer 22 and a plastic film layer 23.

What is claimed is:

1. Method of making a screw cap liner which comprises extrusion coating an ordered polyolefin directly to a compressible board and thereafter punching discs from said film-coated board.

2. Method of making a screw cap liner which comprises extrusion coating an ordered polyolefin consisting of a high density polyethylene film directly to a compressible paperboard and thereafter punching discs from said film-coated board.

3. Method of making a screw cap liner which comprises extrusion coating an ordered polyolefin consisting of a high density polyethylene film directly to a metal foil-coated compressible paperboard on a metal foil-coated side thereof and thereafter punching discs from said film-coated board.

4. Method of making a screw cap liner which comprises extrusion coating an ordered polyolefin consisting of an isotactic polyproplyene film directly to a compressible paperboard and thereafter punching discs from said film-coated board.

5. Method of making a screw cap liner which comprises extrusion coating an ordered polyolefin of a thickness of between 1 and about 2 mils directly to a compressible paperboard having a thickness between about 35 and about 45 mils and thereafter punching discs from said film-coated board.

6. Method of making a screw cap assembly comprising extrusion coating an ordered polyolefin directly to a compressible board, punching a disc-shaped liner from said film-coated board, and setting the uncoated surface of said liner against a substantially flat portion of a rigid cap member adapted to fit over the lip of a hollow container so that the flat portion rests on the lip.

7. Method of making a screw cap assembly from a rigid cap member adapted to fit over the lip of a container and having a substantially flat portion adapted to rest on the lip and a raised portion adapted to ring the neck of said container which comprises extrusion coating an ordered polyolefin consisting of a high density polyethylene film directly to a compressible paperboard, punching a disc-shaped insert from said film-coated board, inserting said disc into the cap and setting the uncoated surface of said disc against the flat portion of the cap.

8. Method of making a screw cap assembly from a rigid cap member adapted to fit over the lip of a container and having a substantially flat portion designed to rest on the lip and a raised portion adapted to ring the neck of said container which raised portion has at least one inward projection biased against an outward projection on the neck to provide tightening of the cap member on the container lip which comprises extrusion coating an ordered polyolefin consisting of a high density polyethylene film directly onto the metal foil-coated side of a metal foil-coated compressible paperboard, punching a disc-shaped insert from said film-coated board, inserting said disc into the cap and setting the uncoated surface of said disc against the flat portion of the cap.

References Cited

UNITED STATES PATENTS

| | | | |
|---|---|---|---|
| 2,441,173 | 5/1948 | Warth et al. | 215—40 |
| 2,829,790 | 4/1958 | Isele-Aregger | 215—40 |
| 2,944,586 | 7/1960 | Yanulis | 117—4 X |
| 2,984,342 | 5/1961 | Smith | 117—4 X |

CHARLIE T. MOON, *Primary Examiner.*